United States Patent [19]

Matsumoto et al.

[11] 4,325,933

[45] Apr. 20, 1982

[54] PROCESS FOR STABILIZATION OF SODIUM PERCARBONATE

[75] Inventors: Tadao Matsumoto, Chiba; Masaaki Koizawa, Iateishi, both of Japan

[73] Assignee: Kao Soap Co., Ltd., Tokyo, Japan

[21] Appl. No.: 158,434

[22] Filed: Jun. 11, 1980

Related U.S. Application Data

[63] Continuation of Ser. No. 31,430, Apr. 19, 1979.

[30] Foreign Application Priority Data

Apr. 28, 1978 [JP] Japan ................................. 53/51763

[51] Int. Cl.$^3$ ..................... C01B 31/00; C01B 15/37; C09K 3/00
[52] U.S. Cl. ............................... 423/415 P; 423/272; 252/186
[58] Field of Search ........................... 423/415 P, 272; 252/186

[56] References Cited

U.S. PATENT DOCUMENTS

| | | | |
|---|---|---|---|
| 1,225,872 | 5/1917 | Schaidhauf | 423/415 P |
| 3,860,694 | 1/1975 | Jayawant | 423/415 P |
| 4,146,571 | 3/1979 | Will et al. | 423/415 P |
| 4,179,394 | 12/1979 | Dillouburg et al. | 423/415 P |

FOREIGN PATENT DOCUMENTS

| | | | |
|---|---|---|---|
| 2511143 | 10/1975 | Fed. Rep. of Germany | 423/415 P |
| 47-32519 | 8/1972 | Japan | 423/415 P |
| 131930 | 9/1919 | United Kingdom | 423/415 P |

*Primary Examiner*—Gary P. Straub
*Attorney, Agent, or Firm*—Blanchard, Flynn, Thiel, Boutell & Tanis

[57] ABSTRACT

Sodium percarbonate can be stabilized by treatment with an aqueous solution of an alkaline earth metal salt to form a thin layer of an alkaline earth metal carbonate on the surface. The resulting sodium percarbonate is improved its respect to the nonhygroscopic property, while maintaining the same solubility in water and effective oxygen content as initially.

8 Claims, No Drawings

PROCESS FOR STABILIZATION OF SODIUM PERCARBONATE

This is a continuation, of application Ser. No. 31 430, filed Apr. 19, 1979.

The present invention relates to a process for the stabilization of sodium percarbonate and for the preparation of sodium percarbonate having excellent storage characteristics.

Sodium percarbonate is known as a bleaching agent or oxidant, and sodium percarbonate is a typical oxygen type bleaching agent, another one of which is sodium perborate. Sodium percarbonate is ordinarily prepared by reacting sodium carbonate with hydrogen peroxide and is represented by the formula, $2Na_2CO_3 \cdot 3H_2O_2$.

At room temperature, the bleaching power of sodium percarbonate is slightly lower than that of a chlorine type bleaching agent, but it is advantageous in that yellowing is not caused even when it is applied to synthetic fibers, animal fibers, resin-processed fibers and fibers treated with fluorescent whitening agents and that it does not damage fabrics. Furthermore, if the temperature is elevated or a decomposition promoter is used in combination, a sufficient bleaching effect can be attained. Accordingly, sodium percarbonate is widely used as a household or industrial bleaching agent.

The reason why sodium percarbonate attracts attention as an ingredient of an ordinary detergent or household bleaching agent is that its decomposition products do not cause any environmental pollution and such detergent or bleaching agent can be used without causing any trouble regardless of the application method.

However, sodium percarbonate has a fatal defect that its storage stability is much poorer than that of sodium perborate and the effective oxygen is promptly lost during storage. Furthermore, because of a high affinity with water, the surface of sodium percarbonate is readily wetted with moisture even at a low moisture content in the atmosphere, and decomposition is readily caused. Moreover, if there is present an ion of iron, copper, manganese, cobalt or the like, the decomposition is promoted and the stability is drastically degraded. Thus, the stability characteristics of sodium percarbonate are much lower than those of sodium perborate. Indeed, when sodium percarbonate alone is stored in a sealed vessel, its storage stability is not different from that of sodium perborate. However, if sodium percarbonate is mixed with a detergent or is allowed to stand in the open state, the moisture-absorbing property is very high and the storage stability is extremely poor, though the solubility of sodium percarbonate is very high.

Accordingly, it is desired to develop sodium percarbonate in which decomposition is not promoted even if it is allowed to stand in the open state and in which no practical problem is caused in connection with the storage stability even if it is incorporated into a detergent or bleaching composition.

The following methods for stabilization of sodium percarbonate have heretofore been proposed.

(1) A method in which the amounts of impurities in the starting materials for production of sodium percarbonate are reduced.

(2) A method in which sodium percarbonate is prepared while incorporating a hydrogen peroxide stabilizer.

(3) A method in which sodium percarbonate is prepared by using an organic solvent.

(4) A method in which sodium percarbonate is coated with an organic or inorganic substance.

These known stabilization methods will now be described.

In the stabilization method (1), sodium carbonate which has been treated with an alkaline earth metal salt to precipitate and separate the iron component or treated with ethylenediamine tetra-acetate to chelate heavy metal ions is used as the starting material for production of sodium percarbonate. In the stabilization method (2), the hydrogen peroxide in sodium percarbonate is stabilized by a phosphate, a silicate or the like, and this method is disclosed in the specifications of U.S. Pat. No. 2,541,733, U.S. Pat. No. 2,986,448, U.S. Pat. No. 3,801,706 and British Pat. No. 568,754. In the stabilization method (3), incorporation of impurities that degrade the stability of sodium percarbonate is prevented by the use of an organic solvent and decomposition is prevented by performing drying completely. This method is disclosed in Japanese Patent Publications No. 32518/72 and No. 16798/73. These stabilization methods (1) through (3) are not effective to improve substantially the poor storage stability of sodium percarbonate. The causes of promotion of decomposition of sodium percarbonate can be eliminated by these methods, but decomposition owing to moisture absorption by sodium percarbonate per se under high-temperature and high-humidity conditions is not prevented by these stabilization methods and hence, it cannot be said that the storage stability of sodium percarbonate is substantially improved by these methods. Accordingly, the method (4) in which particles of sodium percarbonate are insulated from the outer atmosphere to prevent them from absorbing moisture and falling in contact with impurities has been noted in the art. According to one proposal of the method (4), sodium percarbonate is coated with a paraffin or a polyethylene glycol having a molecular weight of 3,000 to 8,000. However, when a paraffin is used, the solubility in water is drastically reduced and a product having a practical utility cannot be obtained. Sodium percarbonate coated with such polyethylene glycol is soluble in water, but since the polyethylene glycol per se has a considerable moisture absorbing property, a high stabilizing effect cannot be maintained when the coated product is stored for a long time. Moreover, this stabilization method (4) is defective in that the content of effective oxygen necessary for bleaching is relatively lowered because of the presence of the coating agent.

We made researches with a view to developing a process capable of stabilizing sodium percarbonate for a long time, and as a result, it was surprisingly found that when the surface of sodium percarbonate is treated with at least one water-soluble alkaline earth metal salt, sodium percarbonate is effectively stabilized and the moisture absorption can be maintained at a very low level for a long time without degradation of the water solubility or relative reduction of the content of effective oxygen. Based on this finding, we have now completed the present invention.

According to the present invention, the surfaces of fine or coarse particles of sodium percarbonate are contacted and reacted with an alkaline earth metal salt to form a very thin surface layer of the alkaline earth metal salt having no moisture absorbing property, whereby sodium percarbonate is effectively stabilized.

A water-soluble alkaline earth metal is used as a stabilizer at the step of synthesizing sodium percarbonate, but since an alkaline earth metal carbonate is formed as a by-product in this case, such water-soluble alkaline earth metal salt is used only in a very small amount. Furthermore, since such by-product is present in the resulting sodium percarbonate, the stability of the product under high-temperature and high-humidity conditions is drastically degraded.

The alkaline earth metal salt that is used in the present invention should have a higher water solubility than that of the corresponding alkaline earth metal carbonate, and at least one member selected from magnesium, calcium, strontium and barium salts is employed. As typical instances, there can be mentioned magnesium sulfate, magnesium chloride, calcium chloride, strontium chloride and barium chloride. The amount of such water-soluble alkaline earth metal salt to be reacted with sodium percarbonate is determined according to the surface area of fine or coarse particles of sodium percarbonate. However, it is preferred that the water-soluble alkaline earth metal salt be reacted in an amount of 0.07 to 0.3 mole, especially 0.1 to 0.2 mole, per mole of sodium percarbonate having an average particle size of 100 to 1000$\mu$. When the amount of the alkaline earth metal salt is smaller than 0.07 mole per mole of sodium percarbonate, the storage stability is low and the moisture absorbing property is not substantially different from that of untreated sodium percarbonate. When the amount of the alkaline earth metal salt is larger than 0.3 mole per mole of sodium percarbonate, the water solubility of stabilized, surface-treated sodium percarbonate is reduced and a practical problem is often caused with respect to the bleaching speed. Accordingly, it is preferred that the water-soluble alkaline earth metal salt be used in an amount of 0.07 to 0.3 mole per mole of sodium percarbonate.

The treatment method for reacting sodium percarbonate with the alkaline earth metal salt is not particularly critical in the present invention so far as a thin film of the alkaline earth metal salt is formed on the surface of sodium percarbonate. As preferred treatment methods, there can be mentioned a method in which an aqueous solution of an alkaline earth metal salt is sprayed on sodium percarbonate, a method in which sodium percarbonate is mixed with an aqueous solution of an alkaline earth metal salt and the mixture is agitated, and a method in which an alkaline earth metal salt is added to a suspension of sodium percarbonate and the mixture is agitated. After such treatment, the surface-treated sodium percarbonate product is separated by such means as filtration or centrifugal separation, and after water washing conducted according to need, the product is dried according to customary procedures to obtain stable sodium percarbonate.

Stabilized, surface-treated sodium percarbonate obtained according to the present invention may further be subjected to a conventional treatment for improving the bleaching effect, for example, a heat treatment as disclosed in Japanese Patent Application Laid-Open Specification No. 70286/75.

According to the above-mentioned process of the present invention, sodium percarbonate having a good storage stability under high-temperature and high-humidity conditions can be obtained.

The present invention will now be described in detail by reference to the following Examples that by no means limit the scope of the invention.

EXAMPLE 1

Surface Treatment:

To 300 ml of a 1% by weight aqueous solution of calcium chloride (the liquid temperature being maintained at 25° C.), 50 g of dried granular sodium percarbonate was added, and the mixture was gently agitated for 1 minute and immediately filtered to recover sodium percarbonate. The recovered product was dried for 4 hours at a temperature of 50° C. and under a pressure of 3 mmHg. By this surface treatment, calcium was consumed in an amount of 2.1% by weight, based on sodium percarbonate.

Result:

The thus-surface-treated product of the present invention and untreated sodium percarbonate (comparative sample) were tested alone or in the form of a mixture with a detergent in which the detergent/sodium percarbonate weight ratio was 8/2 with respect to the storage stability. The obtained results are shown in Table 1. From the data shown in Table 1, it will readily be understood that the product of the present invention has an excellent storage stability even under severe conditions.

TABLE 1

| | Storage Conditions | Test Items | Product of Present Invention | Untreated Comparative Sample |
|---|---|---|---|---|
| PC Alone | standing for 5 days at temperature of 40° C. under relative humidity of 80% | residual ratio of effective oxygen (%) | 94 | 67 |
| | | weight increase ratio (%) | 4 | 46 |
| Mixture of 8 Parts by Weight of Detergent and 2 Parts by Weight of PC | standing for 5 days at temperature of 40° C. under relative humidity of 80% | residual ratio of effective oxygen (%) | 49 | 33 |
| | | weight increase ratio (%) | 15 | 28 |
| Mixture of 8 Parts by Weight of Detergent and 2 Parts by Weight | standing for 30 days in sealed state at temperature of 40° C. under relative humidity | residual ratio of effective oxygen (%) | 74 | 62 |

TABLE 1-continued

|  | Storage Conditions | Test Items | Product of Present Invention | Untreated Comparative Sample |
|---|---|---|---|---|
| of PC | of 80% | | | |

Note
PC: sodium percarbonate
Effective oxygen amount: measured based on dry product
Residual ratio of effective oxygen (%) = [(effective oxygen amount after standing)/(effective oxygen amount at initial stage)] × [(weight increase ratio) + 100]
Weight increase ratio (%) = [(weight of sample after standing)/(weight of sample at initial stage) − 1] × 100

EXAMPLE 2

Surface Treatment:

300 ml of a 1% by weight aqueous solution of magnesium chloride was uniformly sprayed to 50 g of dried granular sodium percarbonate, and the thus treated sodium percarbonate was dried for 4 hours at a temperature of 50° C. and under a pressure of 3 mmHg. Magnesium was consumed for this surface treatment in an amount of 0.3% by weight, based on sodium percarbonate.

Results:

The thus-surface-treated product of the present invention was allowed to stand at a temperature of 40° C. under a relative humidity of 80% for 5 days, and the stabilizing effect was examined in the same manner as in Example 1 to obtain the results shown in Table 2.

For comparison, a mixture comprising 80% by weight of sodium percarbonate, 19% by weight of a polyethylene glycol having an average molecular weight of 6,000 (PEG-6000) and 1% by weight of a nonionic surface active agent (Softanol 30 manufactured by Nippon Shokubai Kagaku K.K.) was agitated at 70° C. for 30 minutes by means of a Nauter mixer to meltatick PEG-6000 to sodium percarbonate and the thus treated sodium percarbonate was cooled by means of a fluidized bed drier to obtain a comparative product (I). Moreover, 11.2 g of phenecetin, 0.6 g of acetanilide and 3.2 g of magnesium chloride were dispersed in 150 ml of methanol, and the dispersion was sprayed uniformly to 3 Kg of sodium percarbonate. Thus, drying was conducted with warm air maintained at 50° C. to remove methanol and obtain a comparative product (II). In the same manner as described above, these comparative products were tested with respect to the stabilizing effect to obtain the results shown in Table 2.

TABLE 2

|  | Product of Present Invention | Comparative Product (I) | Comparative Product (II) |
|---|---|---|---|
| Residual ratio of effective oxygen (%) | 91 | 55 | 62 |
| Weight increase ratio (%) | 2 | 43 | 44 |

The embodiments of the invention in which an exclusive property or priviledge is claimed are defined as follows:

1. A process for preparing stabilized sodium percarbonate which comprises the steps of: contacting particles of sodium percarbonate with a treating agent comprised of an aqueous solution of barium chloride under conditions effective to react the sodium percarbonate on the surfaces of said particles with said barium chloride to form a thin surface layer of barium carbonate on the surfaces of said sodium percarbonate particles; and then separating and drying said surface-treated particles.

2. A process for preparing stabilized sodium percarbonate which comprises the steps of: contacting particles of sodium percarbonate with a treating agent comprised of an aqueous solution of strontium chloride under conditions effective to react the sodium percarbonate on the surfaces of said particles with said strontium chloride to form a thin surface layer of strontium carbonate on the surfaces of said sodium percarbonate particles; and then separating and drying said surface-treated particles.

3. A process for preparing stabilized sodium percarbonate which comprises the steps of: contacting particles of sodium percarbonate with a treating agent comprised of an aqueous solution of calcium chloride under conditions effective to react the sodium percarbonate on the surfaces of said particles with said calcium chloride to form a thin surface layer of calcium carbonate on the surfaces of said sodium percarbonate particles; and then separating and drying said surface-treated particles.

4. A process for treating sodium percarbonate particles to stabilize same, which consists essentially of the steps of: spraying onto the surfaces of preformed particles of sodium percarbonate having a particle size of from 100 to 1,000 microns, a treating agent consisting essentially of an aqueous solution of one or more water-soluble alkaline earth metal salts selected from the group consisting of magnesium sulfate, magnesium chloride, calcium chloride, strontium chloride and barium chloride, under conditions effective to react from 0.07 to 0.3 mole of said alkaline earth metal salt per mole of said sodium percarbonate to form a thin surface layer of alkaline earth metal carbonate on the surfaces of said sodium percarbonate particles; and then separating and drying said surface-treated sodium percarbonate particles.

5. A process for treating sodium percarbonate particles to stabilize same, which consists essentially of the steps of: adding preformed particles of sodium percarbonate having a particle size of from 100 to 1,000 microns, to a treating agent consisting essentially of an aqueous solution of one or more water-soluble alkaline earth metal salts selected from the group consisting of magnesium sulfate, magnesium chloride, calcium chloride, strontium chloride and barium chloride, and agitating the mixture under conditions effective to react from 0.07 to 0.3 mole of said alkaline earth metal salt per mole of said sodium percarbonate to form a thin surface layer of alkaline earth metal carbonate on the surfaces of said sodium percarbonate particles; and then separating and drying said surface-treated sodium percarbonate particles.

6. A process for treating sodium percarbonate particles to stabilize same, which consists essentially of the steps of: adding to an aqueous slurry of preformed particles of sodium percarbonate having a particle size of from 100 to 1,000 microns, a treating agent consisting essentially of one or more water-soluble alkaline earth metal salts selected from the group consisting of magnesium sulfate, magnesium chloride, calcium chloride, strontium chloride and barium chloride, and agitating the mixture under conditions effective to react from 0.07 to 0.3 mole of said alkaline earth metal salt per mole of said sodium percarbonate to form a thin surface layer of alkaline earth metal carbonate on the surfaces of said sodium percarbonate particles; and then separating and drying said surface-treated sodium percarbonate particles.

7. A process as claimed in claim 4, claim 5 or claim 6 wherein the amount of said alkaline earth metal salt that is reacted with said sodium percarbonate particles is from 0.1 to 0.2 mole per one mole of said sodium percarbonate.

8. Sodium percarbonate obtained by a process as claimed in claim 4, claim 5 or claim 6.

* * * * *